United States Patent [19]

Wang

[11] Patent Number: 5,439,369
[45] Date of Patent: Aug. 8, 1995

[54] MOLD LOCKING DEVICE FOR AN INJECTING MACHINE

[75] Inventor: Jui-Hsiang Wang, Tainan Hsien, Taiwan

[73] Assignee: Hwa Chin Machinery Factory, Co., Ltd., Tainan Hsien, Taiwan

[21] Appl. No.: 249,629

[22] Filed: May 26, 1994

[51] Int. Cl.⁶ .............................................. B29C 45/66
[52] U.S. Cl. ..................................... 425/589; 425/595
[58] Field of Search ............................... 425/595, 589

[56] References Cited

U.S. PATENT DOCUMENTS 4,571,169 2/1986 Shima et al. ....................... 425/589

*Primary Examiner*—Tim Heitbrink
*Attorney, Agent, or Firm*—Morton J. Rosenberg; David I. Klein

[57] ABSTRACT

A mold locking device for an injection molding machine is provided. The device includes a stationary disc and a movable disc displaceable to lock a mold placed between the stationary disc and the movable disc. Four oil cylinders are provided to move the movable disc on four guide rods back and forth. Four push rods are provided, each having a front end secured to the movable disc and a rear end extending through four cylindrical tubes disposed with a respective one of four holes formed in a support disc. A piston disposed within a piston chamber formed in a front surface of the support disc is pushed forward to respectively push a shield plate. The shield plate displaces the four push rods so as to push the movable disc with a great force, after the movable disc has been pushed forward to lock the mold stably.

1 Claim, 3 Drawing Sheets

MOLD LOCKING DEVICE FOR AN INJECTING MACHINE

BACKGROUND OF THE INVENTION

An injecting machine uses a large pressure to inject material plastic in a mold. Therefore, the locking force of the mold must be greater than the injecting pressure of the injecting machine. Otherwise, the plastic material can be pushed out of the mold, making the products have undesirable hairy sides.

A conventional mold locking device, as shown in FIG. 4, includes a support disc 10, a movable disc 20, and connecting rods 30 with joints are provided between the movable disc 20 and the support disc 10. A hydraulic oil cylinder 40 is mounted on the front of the support disc 10. A cross-shaped head 50 is connected with a piston rod of the oil cylinder 40 for pushing the movable disc along the guide rods 60 to lock a mold disposed between the movable disc 20 and a stationary disc 70.

The conventional mold locking device just mentioned has undesirable features, such as (1) the bearings in the connecting rods are easily worn out, deteriorating the accuracy of the machine, and (2) the pushing distance for locking is too short to adjust the thickness of the mold.

Another conventional mold locking device utilizes an oil cylinder to directly lock a mold. But, for that system, related components are many, and are inconvenient for performing repair work.

SUMMARY OF THE INVENTION

This invention is directed to a mold locking device for locking a mold for an injection molding machine with two stages of locking for withstanding a large pressure.

BRIEF DESCRIPTION OF THE DRAWINGS

The invention will be better understood by reference to the accompanying drawings, wherein.

DESCRIPTION OF THE PREFERRED EMBODIMENTS

Figure 1:
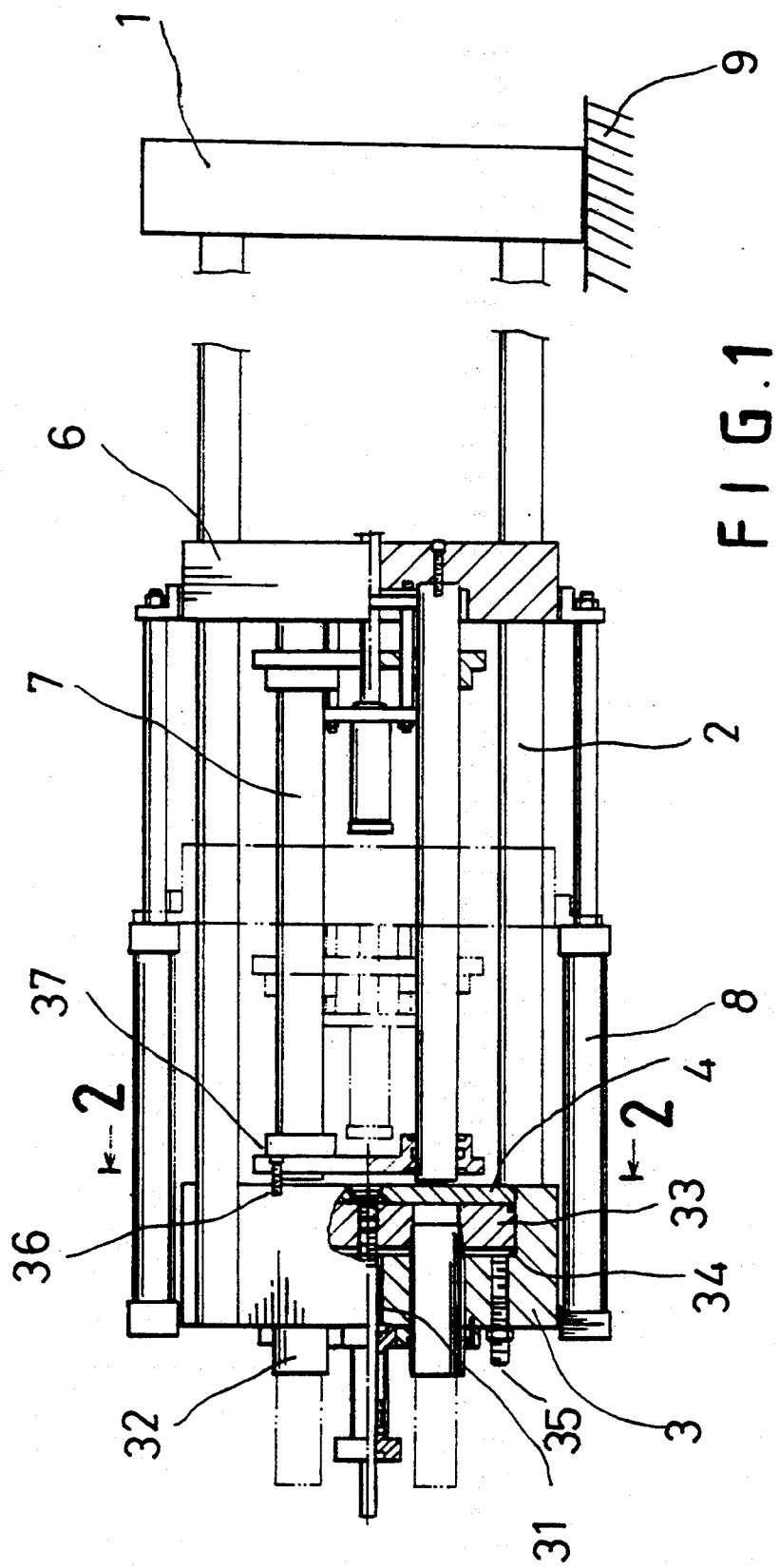
FIG. 1 is a front view of a mold locking device for an injecting machine in the present invention.
Figure 2:
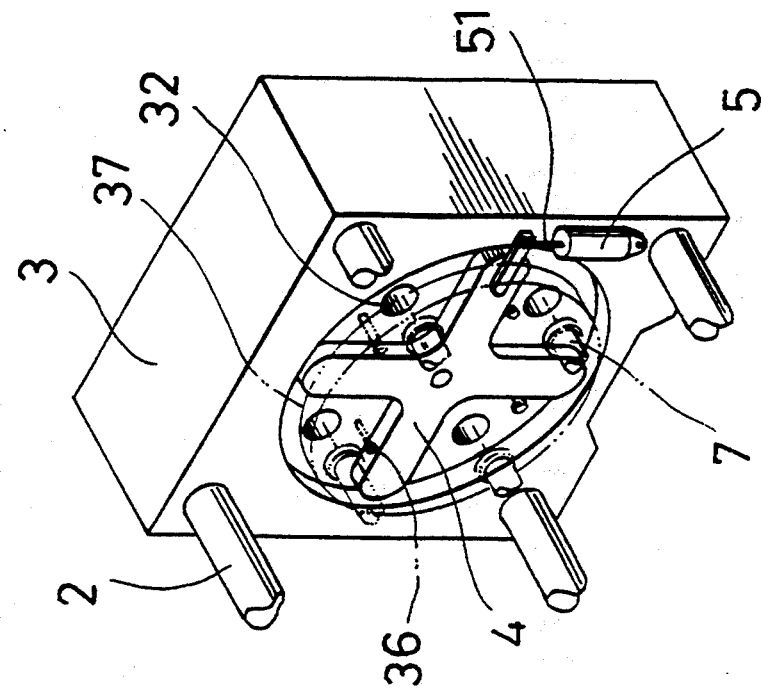
FIG. 2 is a perspective view taken from line 2—2 in FIG. 1.
Figure 3:
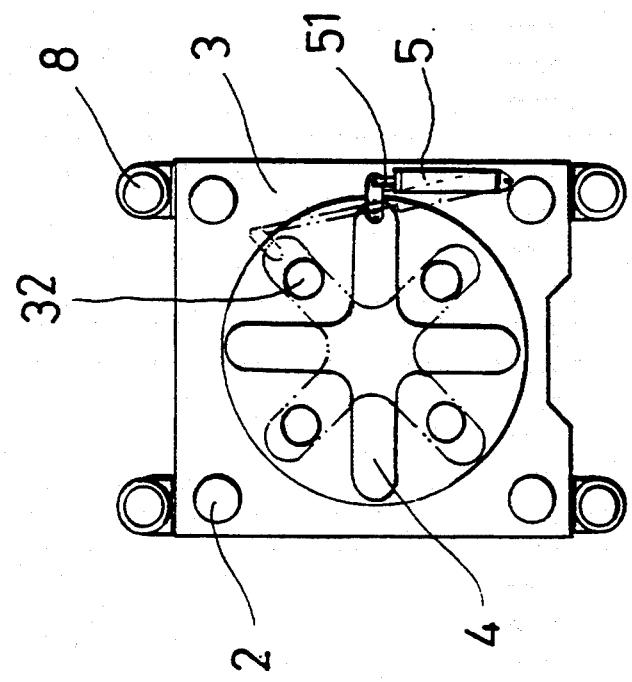
FIG. 3 is a front view of a shield plate in a support disc of the mold locking device of the present invention, showing the rotation angle of the shield plate; and, FIG. 4 is a front view of a conventional mold locking device for an injecting machine.
Figure 4:
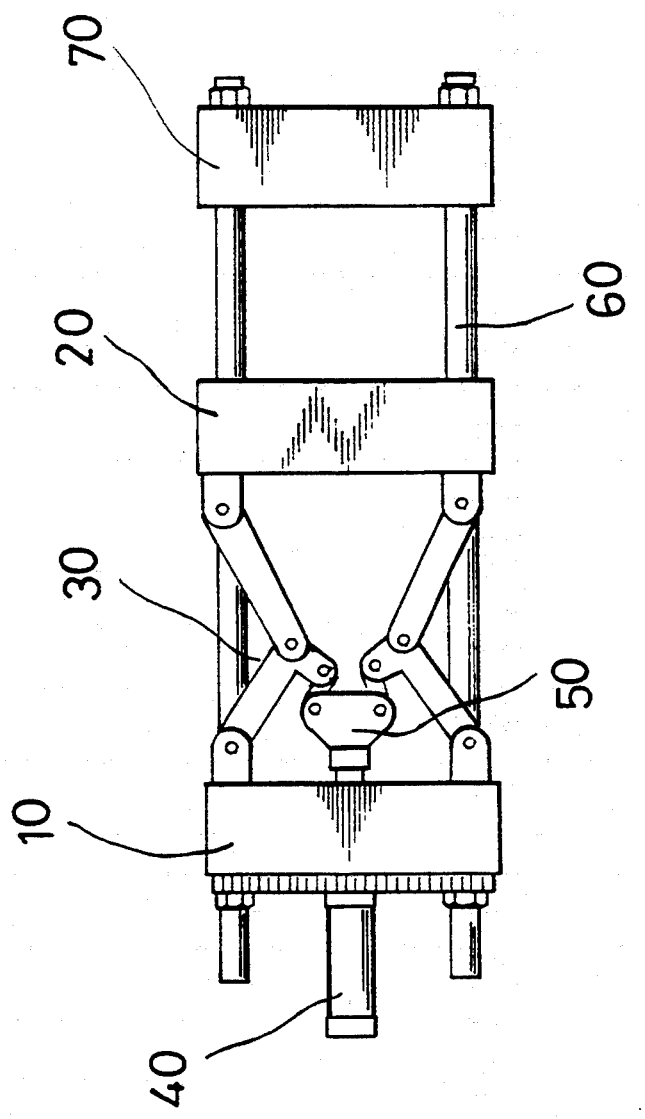

A mold locking device for an injecting machine, as shown in FIGS. 1 and 2, comprises a stationary disc 1, four guide rods 2, a support disc 3, a cross-shaped shield plate 4, a rotating hydraulic oil cylinder 5, a movable disc 6, four push rods 7, and four hydraulic oil cylinders 8 for clamping a mold.

The stationary disc 1 is mounted vertically on a table 9 for a rear side of a mold to rest on.

The four parallel guide rods 2 extend horizontally, each guide rod 2 having a front end fixed firmly at a respective one of the corners of the stationary disc 1, and a rear end fixed firmly at a respective one of the four corners of the support disc 3.

The support disc 3 is coupled to the rear ends of the four parallel guide rods 2, and has a hole 31 for receiving an inspecting means. The inspecting means is used to check if a piston 33 moves forward to displace a shield plate which displaces four push rods 7. The support disc 3 is formed with a plurality of through holes adapted to receive cylindrical tubes 32, such being located at the four corners of support disc 3 near the four guide rods 2. Support disc 3 is formed with a piston chamber 34 formed therein on an inner side thereof for a piston 33 to be displaceably received therein. Four holes are formed in the piston, each hole communicating with a respective one of the four cylindrical tubes 32. An oil hole 35 extends from the piston chamber 34 to the rear of the support disc 3. A frame plate 37 is fixed to the front of the support disc 3 with a screw 36.

The cross-shaped shield plate 4 is mounted on the front surface of the piston 33 which is disposed in the piston chamber 34 of the support disc 3. Shield plate 4 is rotatable through a small angle by means of a rotating hydraulic oil cylinder 5.

The rotating hydraulic oil cylinder 5 is disposed adjacent a front surface of the support disc 3 and has one end pivotally connected therewith. Cylinder 5 has the front end of its piston rod 51 connected with the cross-shaped shield plate 4 for rotation of the cross-shaped shield plate 4 through a preset small angle. The displaced shield plate 4 blocks the four holes in piston 33 which communicate with the cylindrical tubes 32 for pushing the ends of the four push rods 7, providing a second stage of locking after the four push rods 7 have been moved to a locking position.

The movable disc 6 is displaceably installed on an intermediate portion of each of the four guide rods 2, and spaced from the stationary disc 1 for locking a mold therebetween.

The four parallel push rods 7 are provided with their respective front ends fixed to the rear of the movable disc 6. The rear ends of each of the push rods 7 are received within the frame plate 37 and are displaceable therein, displaceable within the four cylindrical tubes 32 of the support disc 3.

The four hydraulic oil cylinders 8, for clamping the mold are provided between the movable disc 6 and the support disc 3 in corresponding locations adjacent the respective corners thereof.

operating this mold locking device for clamping a mold, the four hydraulic oil cylinders 8 are operated to move the movable disc quickly forward along the guide rods 2, displacing disc 6 closer to the stationary disc 1, as a first stage of the locking process. Next, the rotating hydraulic oil cylinder 5 is operated to rotate the cross-shaped shield plate 4 through a preset angle, stopping at the location where the ends of four cross portions of the shield plate 4 are aligned with the four cylindrical tubes 32. After that, oil is forced to flow in the piston chamber 34 through the oil hole 35, displacing the piston 33 therein. Piston 33 moves the cross-shaped shield plate 4 together with the push rods 7 so that the movable disc 6 can be lockingly pushed against the mold, the mold being against the stationary disc, with great force as a second stage of the locking process.

As can be understood from the above-mentioned description, the four hydraulic ell cylinders 8 perform a first stage of the locking process, eliminating the conventional drawback of the limited displacement distance of the arm connect rods in the conventional mold locking device. Then a second stage of clamping the mold is performed by the piston 33, where oil is made to flow in the cylinder chamber 34. As the piston 33 has a rather large dimension, to produce a large force, such provides an improvement over the weak clamping force of locking a mold by the conventional mold locking device mentioned above.

While the preferred embodiments of the invention have been described above, it will be recognized and understood that various modifications may be made thereto and the appended claims are intended to cover all such modifications which may fall within the spirit and scope of the invention.

What is claimed is:

1. A mold locking device for an injection molding machine, comprising:

a stationary disc secured to a base surface for interface with one side of a mold;

four guide rods affixed to said stationary disc, each of said four guide rods having opposing first and second ends, said first end of each said guide rods being secured to said stationary disc adjacent a perimeter portion thereof;

a support disc secured to said second end of each of said four guide rods on a front surface thereof, said support disc having a piston chamber formed in said front surface thereof, said support disc having a first through bore formed centrally in a bottom wall of said piston chamber and four second through bores formed in said bottom wall of said piston chamber, said four second through bores being disposed in radially spaced relationship around said first through bore, said piston chamber bottom wall having an oil passage formed therethrough for providing fluid communication with said piston chamber;

a movable disc slidingly disposed on said four guide rods between said stationary disc and said support disc, said movable disc having opposing front and rear surfaces, said front surface of said movable disc providing an interface with one side of a mold;

a plurality of first hydraulic cylinders coupled between said movable disc and said support disc for displacing said movable disc relative to said support disc to capture a mold between said movable disc and said stationary disc;

four cylindrical tube members respectively secured to said support disc within said second through bores, each of cylindrical tube members having an end portion extending from an front surface of said piston chamber bottom wall;

a piston displaceably disposed within said piston chamber, said piston having a centrally disposed third through bore formed therein in axially aligned relationship with said first through bore, said piston having four fourth through bores formed therein in radially spaced relationship around said third through bore, each of said four fourth through bores being disposed in axially aligned relationship with a respective one of said four second through bores and adapted to be slidingly received on a respective one of said four cylindrical tube members;

four push rod members secured to said movable disc, each of said four push rod members having opposing first and second ends with said first end thereof being secured to said rear surface of said movable disc, each of said four push rod members being disposed in axial alignment with a respective one of said four second through bores for passage therethrough;

a cross-shaped shield plate having four extending arm portions and a shaft extending from a rear surface thereof, said cross-shaped shield plate being pivotally coupled to said piston by extension of said shaft through said third through bore and said first through bore respectively; and, a second hydraulic cylinder having one end coupled to said front surface of said support disc and an opposing end to said cross-shaped shield plate for rotation thereof between a first position and a second position, said first position being defined by each of said four arm portions being disposed in unaligned relationship with said fourth though bores and said second position being defined by each of said four arm portions being disposed in aligned relationship with said fourth though bores, said cross-shaped shield plate being displaced to said second position for interface between each of said four arm portions and said second ends of said four push rod members for displacement thereof responsive to displacement of said piston by oil introduced into said piston chamber through said oil passage.

* * * * *